No. 839,542. PATENTED DEC. 25, 1906.
H. W. BLAISDELL.
MANUAL DISTRIBUTING MACHINE.
APPLICATION FILED NOV. 16, 1904.
2 SHEETS—SHEET 2
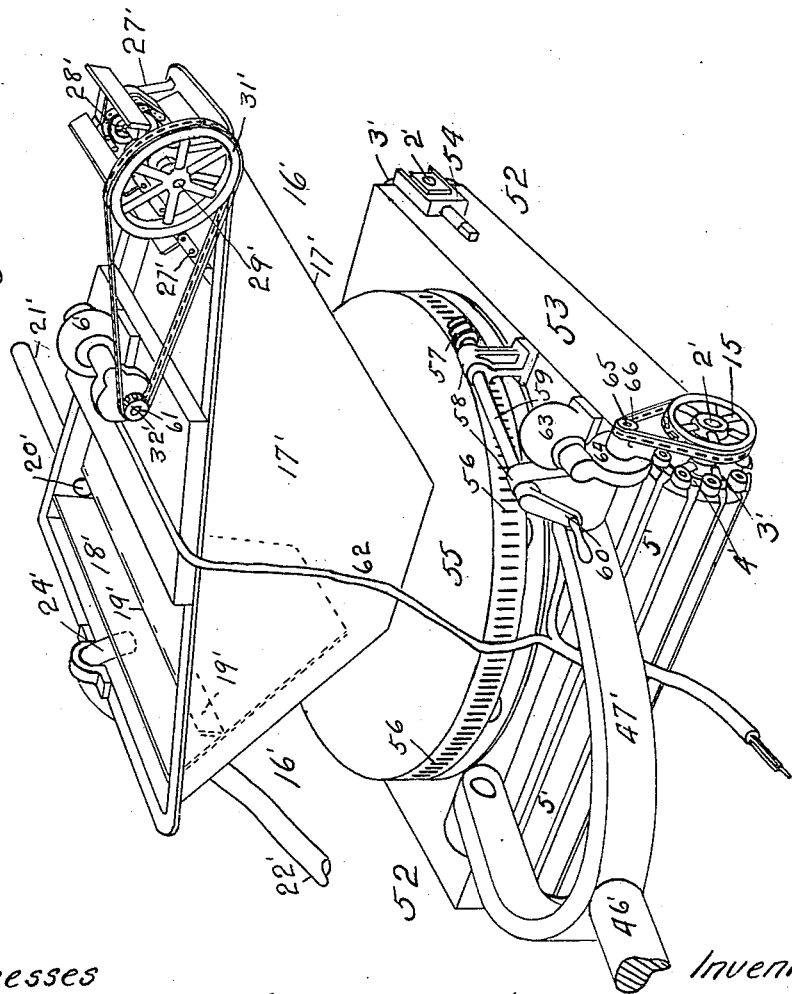
Witnesses
Harry A. Brooks
E. Freeman Mould
Inventor
Hiram W. Blaisdell
By
Stephen Rogers
his Attorney

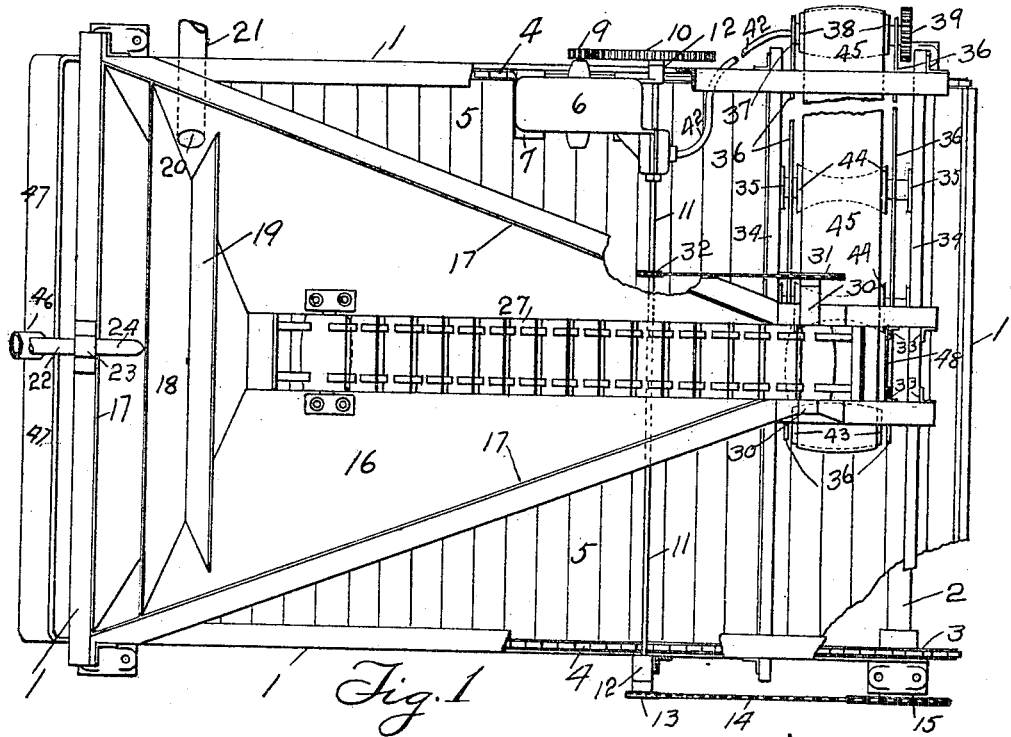

UNITED STATES PATENT OFFICE.

HIRAM W. BLAISDELL, OF LOS ANGELES, CALIFORNIA.

MANUAL DISTRIBUTING-MACHINE.

No. 839,542.      Specification of Letters Patent.      Patented Dec. 25, 1906.

Application filed November 16, 1904. Serial No. 233,006.

*To all whom it may concern:*

Be it known that I, HIRAM W. BLAISDELL, a citizen of the United States, residing at Los Angeles, in the county of Los Angeles and State of California, have invented certain new and useful Improvements in Manual Distributing-Machines; and I do hereby declare the following to be a full, clear, and exact description of the invention, such as will enable others skilled in the art to which it appertains to make and use the same.

This invention relates to means for operating upon filtration plants or filters, and particularly to means constructed to operate upon partially or entirely covered filtration plants or slow sand filters; and some of the objects of the invention are to provide means of this general character which are simple and cheap in construction and easy and inexpensive in operation.

Another object of the invention is to provide means for discharging filtering material in or throughout filters.

A further object of the invention is to provide means so constructed as to be capable of movement over the entire surface of the filter and around or adjacent to the piers or supports for the covering of the filter or around other obstructions in the same.

Still another object of the invention is to provide means for conveying or supplying filtering material to the machine throughout the movement of operation thereof and also to provide means upon the machine to discharge the material so supplied thereto.

Furthermore, an object of the invention is to provide means for conveying or supplying filtering material to the machine by means of a fluid under pressure and for separating the conveying fluid or element from the filtering material and discharging the fluid.

Another object of the invention is to provide means for distributing or discharging material constructed to be supported and travel upon the surface of the filter during the operation of the machine.

With these and other objects in view the invention consists, essentially, in the construction, combination, and arrangement of parts, substantially as more fully described in the following specification and as illustrated in the accompanying drawings, forming part of this application, in which—

Figure 1 is a top plan view of a machine, partly broken away. Fig. 2 is a longitudinal central sectional view of the same, and Fig. 3 is a perspective view of a modification thereof.

Similar characters of reference designate corresponding parts throughout the several views.

This invention is particularly designed and adapted for use upon filtration plants or slow sand filters, which are partially or entirely covered or roofed over, although the invention is equally well adapted for use upon open filters and for other purposes. However, in this application the invention will be described in connection with or as operating upon slow sand filters.

Referring to the drawings, the reference character 1 designates a frame or structure of any suitable form, size, and material, in or upon the lower ends of which are preferably mounted supporting-shafts 2, desirably carrying sets of sprocket or toothed wheels or rollers 3, over which pass chains or belts 4, to the links of which are preferably attached strips or plates 5, thereby forming a flexible traveling support or base for the machine, constructed to rest upon the surface of the filter operated upon and to effect a uniform distribution of the weight of the machine over a large surface of the filter to prevent injury thereto, as will be readily understood by those skilled in the art to which this invention appertains.

The propulsion or travel of the machine over the filter is preferably effected by means of an electric motor 6, suitably mounted upon a support or bracket 7, formed on or connected with the frame 1 of the machine, the motor being provided with suitable connections with the source of electrical supply, and the driving-shaft 8 of the motor carries a pinion 9, desirably meshing with a large gear-wheel 10 on a propelling-shaft 11, mounted in suitable bearings 12 upon the frame 1, and preferably a sprocket-wheel 13 is connected by a sprocket-chain 14 with a large sprocket-wheel 15 on one of the supporting-shafts 2, substantially as illustrated in Fig. 1 of the drawings.

Preferably mounted or secured within the frame 1 is a receiver or hopper 16, desirably having inclined sides 17, Fig. 2, and a partial partition or division plate 18 extending nearly to the bottom of the receiver, to or upon which partition is preferably connected a transverse plate or weir 19, forming with said partition a trough or conduit for the reception of fluid which flows over the weir 19 and desirably escapes or is discharged from the machine through an opening 20 in the side of the receiver 16, around which opening may be connected a discharging pipe or outlet 21, by means of which the conveying fluid or element may be discharged or conveyed from the machine to any desired place of deposit.

The filtering material is preferably conveyed to or discharged into the machine through a flexible or other pipe or connection 22, having removable connection 23 with a discharge spout or nozzle 24, terminating within the receiver 16 and preferably between the side wall 17 thereof and the partial partition 18, essentially as shown.

Preferably journaled in or upon the walls of the receiver 16 is the shaft 25, carrying a tail-pulley 26 of an endless elevator or drag belt 27, of any suitable construction, which also passes over a driving-pulley 28 upon the driving-shaft 29, suitably mounted in bearings 30, preferably formed on or connected with the main frame 1 of the machine, substantially as shown, and upon the driving-shaft 29 is secured a sprocket-wheel 31, chained to a sprocket-wheel 32 on the propelling-shaft 11 of the machine, whereby motion or travel is imparted to the endless conveyer or drag belt 27, as will be readily understood.

Formed on or connected with the frame 1 is a hanger-frame or depending supports 33, preferably provided with guideways 34, constructed to receive wheels or rollers 35, carried by an extensible or movable frame 36, in one end of which is preferably mounted a shaft 37, carrrying a driving-pulley 38 and provided with a spur gear-wheel 39, meshing with a driving-pinion 40 on a driving-shaft 41, having flexible driving connection 42 with the motor 6, substantially as illustrated, by means of which motion is imparted to the driving-pulley 38, as will be readily understood.

In the opposite end of the movable frame 36 is a tail-pulley 43, and mounted in said frame and intermediate of the driving and tail pulleys 37 and 43 are troughing-idlers 44, whereover passes an endless belt or conveyer 45. adapted to receive the filtering material discharged thereupon by the drag-belt 27, substantially as subsequently more fully explained.

The machine is preferably guided or directed by means of a handle or other device 46, connected with a yoke or extension 47 of the frame 1 of the machine, the operator walking upon the filter in the rear of the machine for this purpose, and deflecting-plates 48 may be mounted upon one or both sides of the endless conveyer 45 and beneath the discharging end of the drag-belt or elevator 27 for the purpose of directing the material discharged by the latter upon the endless conveyer.

The operation of the foregoing invention will be readily understood from the foregoing description when taken in connection with the accompanying drawings and the following explanation thereof.

The motor 6 is started, thereby imparting motion to the gear 9 on the driving-shaft thereof, which gear meshes with the gear 10 on the propelling-shaft 11, carrying a sprocket-wheel 13, chained to the sprocket-wheel 15 on one of the supporting-shafts 2, carrying the sets of sprocket-wheels 3, over which travel the endless sprocket-chains 4, thereby imparting motion or travel to the machine, preferably by running the motor at a slow rate of speed when the machine is traveling in a forward direction or is operating and at a high rate of speed when the motor 6 has been reversed and the machine is being backed up.

The filtering material may be conveyed to the machine preferably through the flexible connection 22 in communication with the source of supply, and water under pressure is preferably employed as a vehicle or conveying medium for such conveyance, and the water and filtering material are discharged into the receiver from the spout 24 and gravitate to the bottom of the receiver, where the filtering material is taken up by the drag-belt or endless elevator 27 and discharged over the discharging end of the receiver upon the endless conveyer 45, which conveys and discharges the material at a distance from the machine or at a desired point or place during the travel of the machine.

Water used to convey the filtering material to the machine passes up over the weir 19 into the trough or conduit and out, or escapes through the outlet 20 and the connections 21 to the place of deposit.

Referring to Fig. 3 of the drawings, there is illustrated a modified form of construction hereinbefore described and shown embodying a supporting or traction portion 52, in the sides 53 whereof are mounted or journaled shafts 2′, one whereof is preferably adjustable, as illustrated at 54, and upon said shafts are mounted sets of sprocket-wheels 3′, over which pass sprocket-chains 4′, carrying strips or slats 5′, which may be with or without resilient facings or attachments.

Formed on or connected with the upper side of the traction or supporting portion 52 is a turn-table 55 of any suitable construction, the upper member of which is preferably provided with peripheral teeth 56, constructed to be engaged by a worm 57, revolubly mounted in bearings 58, desirably secured to the supporting or traction portion 52, and the worm-shaft 59 may be provided with a crank 60 for the operation thereof.

Secured upon the upper member of the turn-table is a receiver or hopper 16', desirably constructed with inclined sides 17', and within the receiver 16' is suitably mounted an endless elevator or drag-belt 27', passing over a driving-pulley 28' and over a tail-pulley (not shown) preferably located near the lower portion or bottom receiver, and upon the shaft 29' of the driving-pulley 28' is secured a sprocket 31', chained to a sprocket 32', mounted on the shaft 61, operated through reduction-gearing by the motor 6', having suitable connection 62 with the source of electrical supply. (Not shown.)

Within the receptacle or hopper 16' is preferably mounted a partial partition-plate 18', to which is connected a weir 19', and in the side of the receiver is formed an outlet 20', around which is connected an outlet-pipe 21', communicating with the place of deposit, and an inlet-pipe 22' is preferably connected with a spout or nozzle 24', whereby the filtering material conveyed by a fluid vehicle, preferably under pressure, is discharged into the receiver between the partial partition 18' and the inclined side 17' thereof, and the filtering material settles to the bottom of the receiver, while the fluid vehicle or conveying element weirs up over the weir 19' and passes out through the outlet-pipe 21', substantially as before explained.

The machine is preferably propelled by means of an electric motor 63, driving suitable reduction-gears inclosed in a casing 64, whereby motion is imparted to a propelling-shaft 65, carrying a sprocket 66, chained to a sprocket 15 on one of the supporting-shafts 2' of the supporting-wheels 3', carrying the endless sprocket-chain 4', to which are connected the slats or strips 5', substantially as before explained.

The machine may be guided or operated by means of a handle 46', connected with a yoke 47', attached to the supporting portion or traction device, substantially as illustrated.

The operation of the invention illustrated in Fig. 3 will be readily understood from the foregoing description when taken in connection with the accompanying drawings, and further explanation thereof will not be required further than to say that the distribution of the material is effected directly over the side of the receiver by the action of the drag-belt 27', the receiver being rotated into the desired position by means of the handle or crank 60, as will be readily understood.

It is not desired to limit or confine this invention to the specific construction, combination and arrangement of parts herein shown and described, and the right is reserved to make all such changes in and modifications of the same as come within the spirit and scope of this invention.

I claim—

1. A machine constructed to travel upon a filter provided with a receiver, means for conveying filtering material and a vehicle to the receiver and for discharging the vehicle therefrom, a device for discharging the material from the receiver, an endless conveyer constructed to receive the material so discharged and effect the discharge of the same and mechanism for operating the parts.

2. A manually-guided machine for distributing filtering material provided with a flexible traction device, means for conveying material to the machine, a device for elevating the material from the machine, a conveyer to distribute the material so elevated and mechanism for operating the parts.

3. A machine constructed to travel upon a filter provided with traction means adapted to rest on the filter-bed, means for conveying the filtering material to the machine, an extensible conveyer to discharge the material from the machine and mechanism for operating the parts.

4. A machine constructed to travel upon a filter provided with means for supplying material to the machine, an elevator for removing the material from the machine, an endless conveyer to receive and distribute the material removed by said elevator and mechanism for operating the parts.

5. A machine constructed to travel upon a filter provided with means for supplying material to the machine, an elevator for removing the material from the machine, an endless extensible conveyer to receive and distribute the material removed by said elevator and mechanism operating the parts.

6. A machine constructed to travel upon a filter provided with flexible means for conveying the material to the machine and means for discharging the conveying medium from the machine, an elevator for removing the filtering material from the machine, an extensible conveyer constructed to distribute the material discharged thereon by the elevator, and mechanism for operating the parts.

7. A manually-guided machine constructed to distribute filtering material provided with traction means adapted to rest on the filter-bed, means for supplying material to the machine, a frame movably mounted in the machine, a conveyer carried by said frame to distribute the filtering material from the machine and mechanism for operating the parts.

8. A machine constructed to travel upon the surface of a filter provided with traction means adapted to rest on the filter-bed, means for supplying material to the machine, a movable frame, a conveyer therein constructed to distribute the material from the machine and mechanism for operating the parts.

9. A manually-guided machine provided with traction means adapted to rest on the filter-bed, means for supplying filtering material thereto, guideways upon the machine a frame provided with wheels constructed to travel in said ways, a conveyer mounted in said movable frame constructed to distribute the material from the machine and mechanism for operating the parts.

10. A machine provided with a flexible traction device constructed to rest upon a filter, means for supplying material to the machine, guideways upon the machine, a frame carrying wheels constructed to travel in said guideways, an endless conveyer mounted in said movable frame and mechanism for operating the parts.

11. A machine provided with a traction device constructed to rest upon a filter, means for supplying material to the machine, a movable frame mounted in the machine, an endless conveyer carried by said movable frame, means for imparting motion to said conveyer throughout the movement of said frame and mechanism for operating the parts.

12. A machine provided with a flexible traction device, a receiver, means for conveying filtering material and water to said receiver and for discharging the water therefrom, an elevator to remove the material from the receiver, a frame movably mounted in said machine, an endless conveyer carried by said frame constructed to discharge the material received from said elevator, means for effecting the travel of said elevator throughout the movement of said frame and mechanism for operating the parts.

13. A machine constructed to travel upon a filter provided with a weight-compensating device, means for conducting material and conveying element to the machine, means for separating the material from the conveying element, apparatus for distributing the material, means for disposing of the conveying element and mechanism for operating the parts.

14. A manually-guided machine for filters provided with a weight-distributing portion, means for conducting material and a conveying element to the machine, means for separating the material from the conveying element, apparatus for distributing the material, means for disposing of the conveying element and mechanism for operating the parts.

15. A machine constructed to travel upon a filter provided with a weight-compensating device, means for conducting sand and water to the machine, means for separating the sand from the water, apparatus for distributing the sand, means for disposing of the water and mechanism for operating the parts.

16. A manually-guided machine for filters provided with a weight-distributing portion, means for conducting sand and water to the machine, means for separating the sand from the water, apparatus for distributing the sand, means for disposing of the water and mechanism for operating the parts.

17. A machine constructed to travel upon a filter provided with a weight-compensating device, means for conducting sand and water to the machine and effecting the separation of the sand from the water, apparatus for effecting the disposal of the water, a device for discharging the sand and mechanism for operating the parts.

18. A manually-guided machine for operating upon filters provided with a weight-distributing portion, means for conducting sand and water to the machine and effecting the separation of the sand from the water, apparatus for effecting the disposal of the water, a device for discharging the sand and mechanism for operating the parts.

19. A machine constructed to travel upon a filter provided with a weight-compensating device, means for conducting material and a conveying element to the machine, means for separating the material from the conveying element, apparatus for distributing the material, means for disposing of the conveying element and electrically-operated mechanism for operating the parts.

20. A manually-guided machine for filters provided with a weight-distributing portion, means for conducting material and a conveying element to the machine, means for separating the material from the conveying element, apparatus for distributing the material, means for disposing of the conveying element and electrically-operated mechanism for operating the parts.

21. A machine constructed to travel on a filter provided with a supporting portion constructed to distribute the weight of the machine over a large area, apparatus for conveying material and a fluid to the machine, means for disposing of the fluid, a device for discharging the material and mechanism for operating the parts.

22. A manually-guided machine provided with a supporting portion having movable connection therewith and constructed to distribute the weight of the machine over a large area, apparatus for conveying material and a conveying element to said machine, means for disposing of said element, a device for elevating the material out of the machine and mechanism for operating the parts.

23. A machine constructed to travel upon a filter provided with an extended endless supporting portion, a receiver having an outlet, apparatus for conveying sand and water to said receiver, so that the sand settles to the bottom of said receiver and the water overflows through said outlet, an elevator to discharge the material from said receiver and mechanism for operating the parts.

24. A manually-guided machine for operating upon filters provided with an extended endless base, a receiver with a discharging device, apparatus for discharging material and a fluid into said receiver so that the material falls to the bottom of the receiver and the fluid passes to said discharging device, a device to discharge the material from the receiver and mechanism for operating the parts.

In testimony whereof I have signed my name to this specification, in the presence of two subscribing witnesses, at Los Angeles, county of Los Angeles, State of California, this 2d day of November, 1904.

HIRAM W. BLAISDELL.

Witnesses:
   H. T. MORROW,
   MIGNON FORD.